US010846338B2

(12) United States Patent
Tanaka

(10) Patent No.: US 10,846,338 B2
(45) Date of Patent: Nov. 24, 2020

(54) DATA PROCESSING DEVICE, DATA PROCESSING METHOD, AND NON-TRANSITORY COMPUTER READABLE MEDIUM

(71) Applicant: Toshiba Memory Corporation, Tokyo (JP)

(72) Inventor: Shingo Tanaka, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 589 days.

(21) Appl. No.: 15/067,518

(22) Filed: Mar. 11, 2016

(65) Prior Publication Data

US 2016/0275199 A1  Sep. 22, 2016

(30) Foreign Application Priority Data

Mar. 20, 2015  (JP) .................................. 2015-058741

(51) Int. Cl.
*G06F 16/00* (2019.01)
*G06F 16/901* (2019.01)
(Continued)

(52) U.S. Cl.
CPC ........ *G06F 16/9014* (2019.01); *G06F 16/951* (2019.01); *H04L 69/16* (2013.01)

(58) Field of Classification Search
CPC ........... G06F 17/30321; G06F 17/3033; G06F 17/30619; G06F 17/30864; G06F 17/3087;
(Continued)

(56) References Cited

U.S. PATENT DOCUMENTS 8,484,439 B1 * 7/2013 Frailong ................. G06F 12/06
711/216
9,223,612 B1 * 12/2015 Feldman ................. G06F 9/465
(Continued)

OTHER PUBLICATIONS

LevelDB, "LevelDB is a light-weight, single-purpose library for persistence with bindings to many platforms", http://leveldb.org, pp. 1-6, Jan. 19, 2016.
(Continued)

*Primary Examiner* — Diedra McQuitery
(74) *Attorney, Agent, or Firm* — White & Case LLP

(57) ABSTRACT

According to one embodiment, a data processing device is provided. The request interpreter receives a read request with a specified key and interprets the read request. The first accessor identifies a key that has a positional relation with the specified key in a manner specified by the read request, in an order key string in which a plurality of keys are stored in order under a predetermined rule. The second accessor is implemented by the computer to acquire a second address corresponding to a first address based on a hash value of the key identified by the first accessor from management data associating the first address and the second address each other. The third accessor is implemented by the computer to read out data associated with the second address acquired by the second accessor from among pieces of data respectively associated with a plurality of the second addresses.

14 Claims, 10 Drawing Sheets

(51) Int. Cl.
*G06F 16/951* (2019.01)
*H04L 29/06* (2006.01)

(58) Field of Classification Search
CPC ......... G06F 17/30946; G06F 17/30949; G06F 17/30952; H04L 29/06095
See application file for complete search history.

(56) References Cited

U.S. PATENT DOCUMENTS

| | | |
|---|---|---|
| 2008/0215556 A1* | 9/2008 | Surna .................. G06F 16/245 |
| 2011/0276744 A1 | 11/2011 | Sengupta et al. |
| 2013/0250686 A1* | 9/2013 | Marukame ............. G11C 16/08 365/185.12 |
| 2014/0325115 A1* | 10/2014 | Ramsundar ......... G06F 12/0238 711/102 |
| 2016/0054929 A1 | 2/2016 | Tanaka |

OTHER PUBLICATIONS

RocksDB, "A persistent key-value store for fast storage environments," http://rocksdb.org, pp. 1-2, Jan. 19, 2016.

* cited by examiner

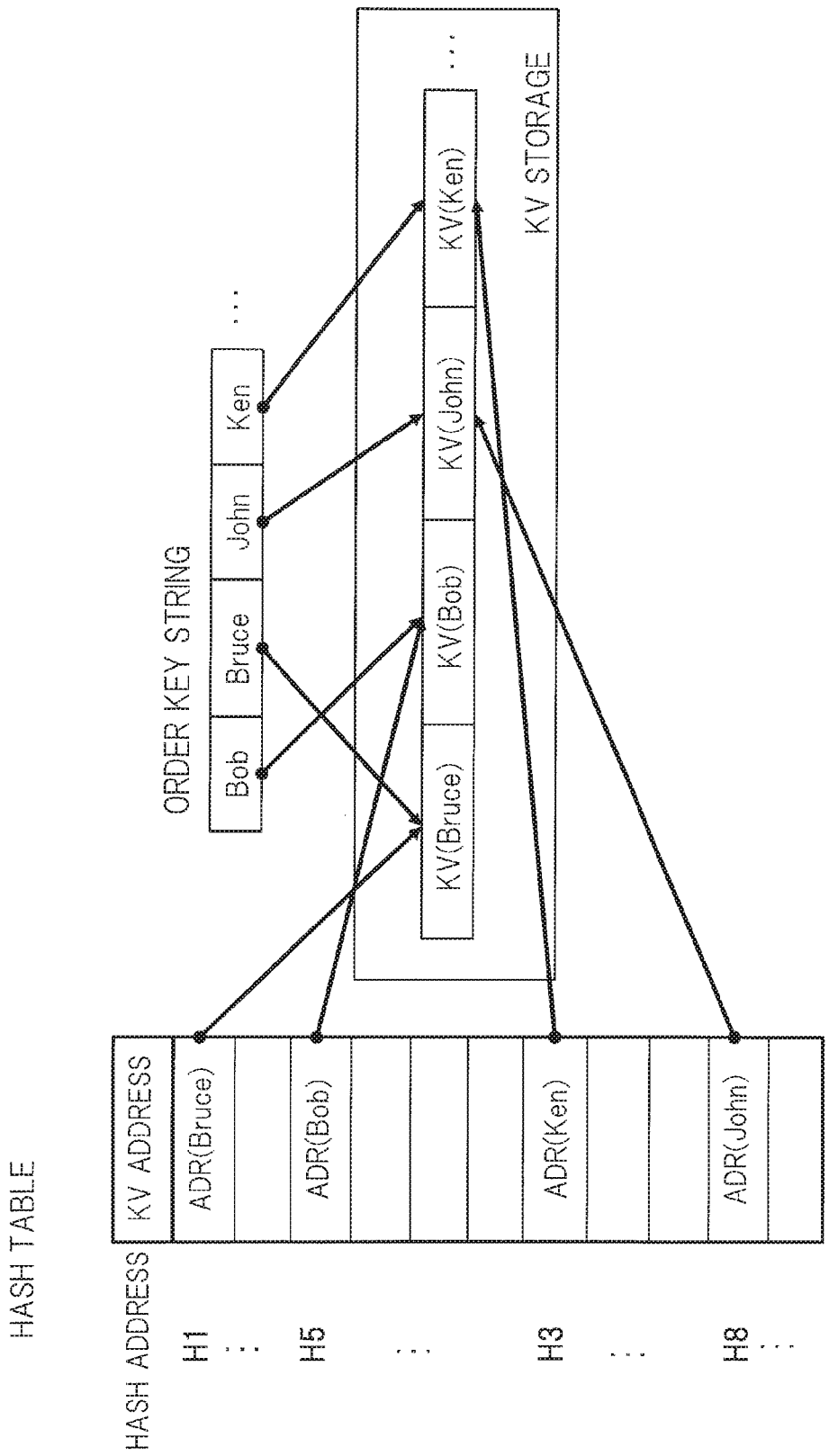
F I G. 3

HASH TABLE

| HASH ADDRESS | KV ADDRESS, DEGENERATED KEY |
|---|---|
| H1 | ADR(Bruce),Sig(Bruce) |
| ⋮ | |
| H5 | ADR(Bob),Sig(Bob) |
| ⋮ | |
| H3 | ADR(Ken),Sig(Ken) |
| ⋮ | |
| H8 | ADR(John),Sig(John) |
| ⋮ | |

FIG.4

DATA PROCESSING DEVICE, DATA PROCESSING METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2015-058741, filed on Mar. 20, 2015; the entire contents of which are incorporated herein by reference.

FIELD

An embodiment of the present invention relates to a data processing device, a data processing method, and a non-transitory computer readable medium.

BACKGROUND

Advanced Web services represented by Web mails and social networks have rapidly spread in recent years. In such Web services, when a Web server receives a Web-page display request from a user, the Web server acquires individual pieces of data of required texts, images, movies or the like by inquiring the pieces of data one by one to a backend storage to return the acquired pieces to the user. As such a storage, while a conventional file-system-based database has been used, an object storage having a high affinity with a content access method on the internet in which a unique URL is specified to access content data has begun to be practically used in recent years. The object storage uses a key-value store (KVS) I/F through which a client device such as a Web server accesses a variable length value with a unique variable length key via Ethernet. In a Web server, generally a key is URL and a value is content data. With respect to a key, an object ID may be not variable but fixed in length but the basic principles and the like are in common. Examples of the storage device include an HDD and an SSD.

In a simplest access method, for example, in read access in response to Key="001", a request (for example, a GET (Key="001")) that specifies a key corresponding a value to be read is transmitted and the value is returned as a response. In write access, a request (for example, a PUT (Key="002", Value="GHI")) that specifies a key and a value to be written is transmitted. Examples of the response include various types such as a response including only a value corresponding to a specified key and a response including both a specified key and a value corresponding to the key.

In an advanced access method, transmitted is a GETNEXT request/a GETPREV request for reading out a value corresponding to a key that is next/previous to a specified key in a dictionary order. For example, it is assumed that four keys and values (Key, Value)=("000", "ABC"), (002, "DEF"), ("004", "GHI"), and ("005", "JKL") are stored. In this case, when a GETNEXT (Key="002") request is transmitted, the value "GHI" corresponding to the next Key="004" is returned as a response. When a GETPREV (Key="002") request is transmitted, the value "ABC" corresponding to the previous Key="000" is returned.

The above requests are used when large data is divided into a plurality of values in association with corresponding keys to read out the values corresponding to the keys sequentially. However, a key specified by a request does not always exist. For example, Key="001" may be specified. Even in this case, a response to a GETPREV (Key="001") is the value "ABC" corresponding to Key="000" while a response to a GETNEXT (Key="001") is the value "DEF" corresponding to Key="002".

Furthermore, a GETRANGE request to which all keys and values arranged between two keys are returned may be issued. For example, a GETRANGE (Key1="001", Key2="004") request is transmitted, (Key, Value)=("002", "DEF") and ("004", "GHI") are returned. In this example, both values and keys are returned as a response.

Examples of a typical form of a key-value store (KVS) include a hash-table based KVS. In a hash-table based KVS, addresses (hereinafter, "KV addresses") on a storage of a value corresponding to keys are managed by a hash table. In a typical manner, a predetermined hash function in which a key is input is calculated, a KV address on a storage having a value stored therein is stored in an entry of an address (hereinafter, "hash address") that is based on the hash value (that is normally a byte string much shorter than the key) on the hash table. As long as a hash address on the hash table is uniquely determined from a hash value, the hash value does not necessarily match the hash address. However, in the descriptions below, it is assumed that a hash value matches a hash address for explanation. Consequently, when a GET request (for reading out a value) or the like is received, a KV address on a storage having a value stored therein can be immediately identified to a key specified by the request by using a hash function. Accordingly, a response is returned by accessing the value at a high speed.

However, a hash-table based KVS cannot return a response to a GETNEXT request/a GETPREV request/a GETRANGE request which have been described above. The reason for this is that a hash-table based KVS can read out a value to a specified key but cannot know what keys are stored previous/next to the specified key. Each key is converted to a hash value by a hash function and treated as a hash address on a hash table. The anteroposterior relation of a hash address on a hash table differs from the actual anteroposterior relation of a key. The actual anteroposterior relation of a key cannot be obtained from a hash table. Therefore, to obtain a key next to a specified key in a predetermined dictionary order of keys, full searching needs to be performed but such searching is impractical.

To response to a GETNEXT request/a GETPREV request/a GETRANGE request which have been described above, there has been a KVS (hereinafter "ordered KVS") in which keys are accessible in a dictionary order. In an ordered KVS, keys are managed not by a hash table but by a data structure that allows dictionary-order access thereby responding to a GETNEXT request/a GETPREV request/a GETRANGE request and the like. As open source software, a LevelDB, a RocksDB and the like are popular. In such an ordered KVS, keys are managed by a data structure such as a B-tree and a LSM-tree, and the keys are searched for on the data structure in response to a normal GET request or the like. When a key is found as a result of the searching, a KV address on a storage of a value corresponding to the key is acquired, the value on the storage is accessed based on the acquired KV address, and the value is returned. In the data structure, the keys are managed in such a way that the keys are lined in a dictionary order. Thus, when a GETNEXT request is received, searching for a specified key is first performed in the similar manner when a normal GET request is received, and thereafter a key next to the key is tracked. Consequently, a KV address of a value corresponding to the next key is accessed. Therefore, the ordered KVS can also respond to a GETNEXT request.

Unlike a hash-table based KVS, the above ordered KVS has a function of responding to a GETNEXT request and the like but has to "search" for a key. Although improvement has been done by many data base techniques in order to increase a response speed, an ordered KVS has a more complicated procedure for identifying a key than a hash-table based KVS in which searching is basically unnecessary. Therefore, it takes a long time to search for a desired value thereby resulting in deterioration in response speed.

BRIEF DESCRIPTION OF THE DRAWINGS

FIG. 3 is a diagram showing pieces of data that include a hash table, an order key string, and values;

FIG. 4 is a diagram showing another example of the hash table;

DETAILED DESCRIPTION

According to one embodiment, a data processing device comprising a computer including at least one processor, the data processing device includes a request interpreter, a first accessor, a second accessor and a third accessor.

The request interpreter is implemented by the computer to receive a read request with a specified key and interpret the read request.

The first accessor is implemented by the computer to identify a key that has a positional relation with the specified key in a manner specified by the read request, in an order key string in which a plurality of keys are stored in order under a predetermined rule.

The second accessor is implemented by the computer to acquire a second address corresponding to a first address based on a hash value of the key identified by the first accessor from management data associating the first address and the second address each other.

The third accessor is implemented by the computer to read out data associated with the second address acquired by the second accessor from among pieces of data respectively associated with a plurality of the second addresses.

Hereinafter, embodiments of the present invention will be described with reference to the drawings.

Figure 1:
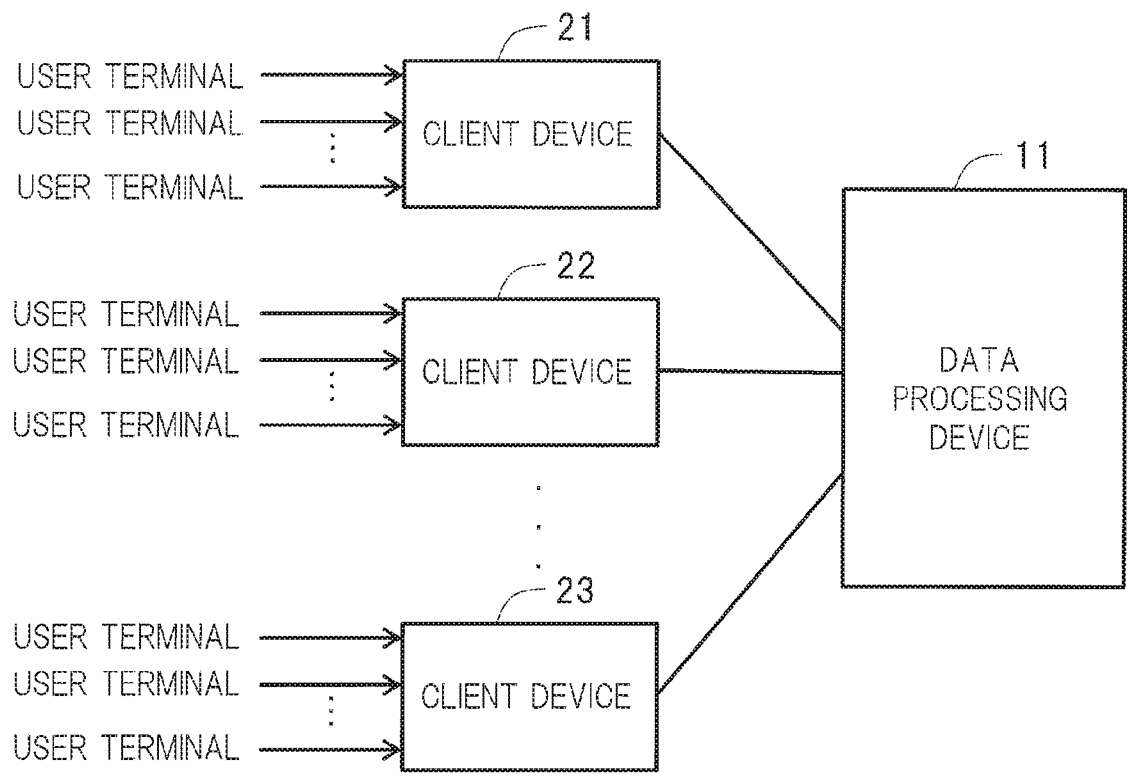
FIG. 1 is a diagram showing a data processing system according to an embodiment of the present invention.

FIG. 1 shows a data processing system according to an embodiment of the present invention. The data processing system includes a data processing device 11 and a plurality of client devices 21 to 23.

The data processing device 11 is a key-value storage device that receives various read or write requests from the client devices 21, 22, and 23 through a network such as Ethernet. For example, the client devices 21 to 23 are servers such as Web servers. When the client devices 21 to 23 are Web servers, the client devices 21 to 23 transmit, to the data processing device 11, a request for writing a key that is URL and a value that is the content data of a Web page (a key-value), for example. Each of the client devices 21 to 23 is connected with user terminals via a network such as the Internet. For example, the client device 21, 22 or 23 receives a write instruction for content data of a specified URL from the user terminal. Based on the write instruction, the client device 21, 22 or 23 generates a key-value write request in which the URL is a key and the content data is a value, and transmits the write request to the data processing device 11. After receiving the key-value write request, the data processing device 11 performs key-value writing processing in accordance with one of the embodiments (described later). When the writing has been completed, a response showing the completion of the writing is returned to the client device 21, 22 or 23.

When the client device 21, 22 or 23 receives a read instruction for a value with a specified key, as an example, from the user terminal, the client device 21, 22 or 23 generates a key-value read request with a specified key to the data processing device 11. After receiving the read request from the client device 21, 22 or 23, the data processing device 11 performs reading processing in accordance with one of the embodiments (described later) to acquire a value and returns a response including the obtained value to the client device 21, 22 or 23. The embodiments of the above data processing device will be described below.

First Embodiment

Figure 2:
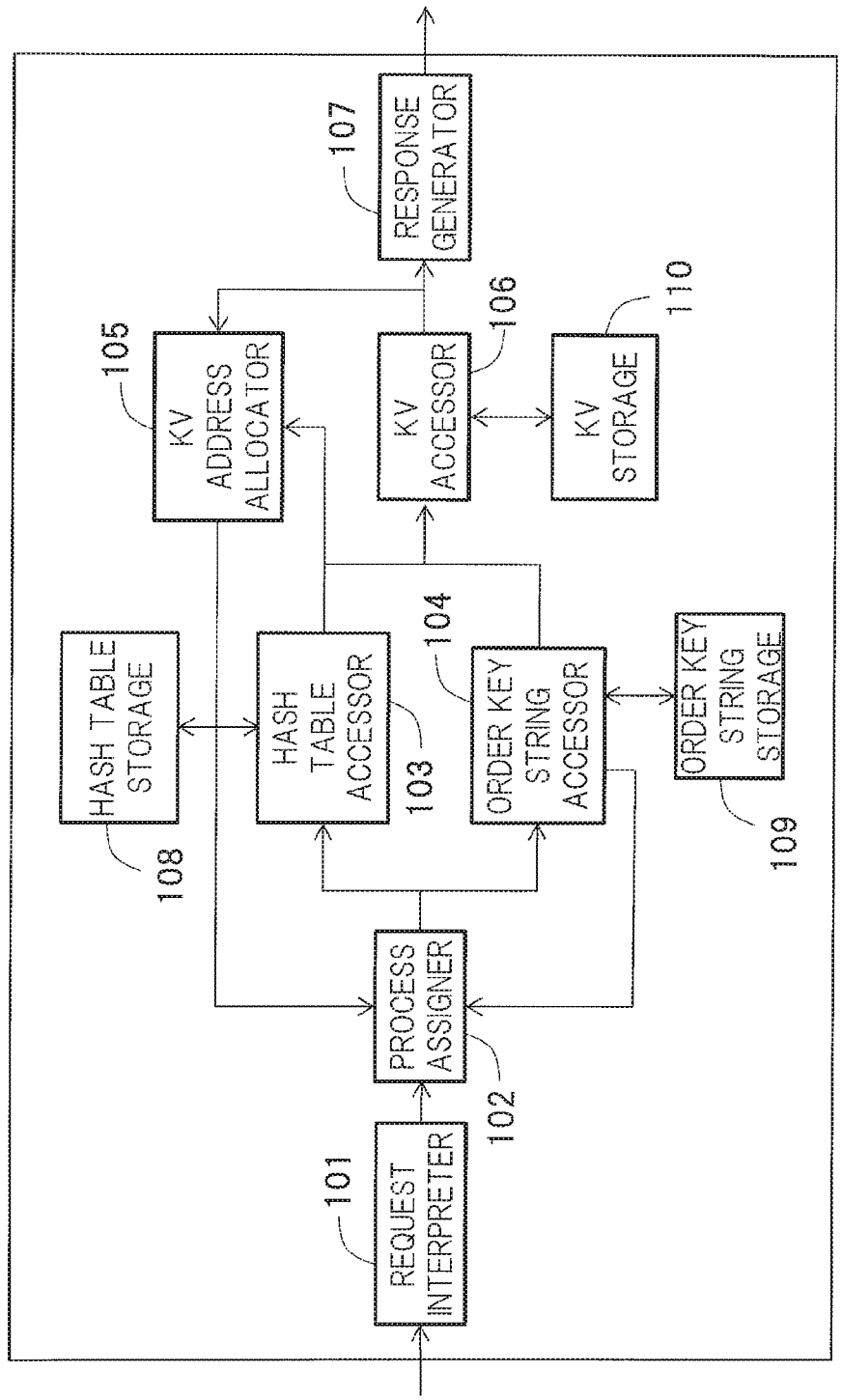
FIG. 2 is a block diagram of a data processing device according to a first embodiment.

FIG. 2 shows a data processing device according to a first embodiment of the present invention.

The data processing device in FIG. 2 includes a request interpreter 101, a process assigner 102, a hash table accessor 103, an order key string accessor 104, a KV address allocator 105, a KV accessor 106, a response generator 107, a hash table storage 108, an order key string storage 109, and a KV storage 110. As an example, the order key string accessor 104, the hash table accessor 103, and the KV accessor 106 correspond to a first accessor, a second accessor, and a third accessor, respectively. In a typical embodiment, this data processing device is constituted by a CPU, a memory, a storage, a network interface, and the like. Some functions of the data processing device may be implemented by dedicated hardware such as an FPGA and an ASIC. That is, the data processing device may be configured by a computer system including at least one processor and the above components 101 to 107 may be mounted to the computer system. The computer system may include at least one memory, one storage, or both of them. The terms "processor", "memory", etc. should be interpreted in a broad sense, as described later.

The request interpreter 101 receives a request such as a GET request, a GETNEXT request, a GETPREV request, a GETRANGE request, or a PUT request and interprets the received request. A GET request is a request for reading a value corresponding to a specified key. A GETNEXT request is a request for reading a value corresponding to a value next to a specified key in a dictionary order. A GETPREV request is a request for reading a value corresponding to a value previous to a specified key in a dictionary order. A GETRANGE request is a request for reading values corresponding to all keys between two specified keys in a dictionary order. A PUT request is a request for writing a specified value in such a way that the value corresponds to a specified key.

In the KV storage 110, pieces of data including keys and values are stored. The pieces of data are managed in such a way that the pieces are associated with corresponding addresses (KV addresses). The KV storage 110 manages the pieces of data that are associated with the corresponding addresses. A key-value is stored for each key. The lower right part in FIG. 3 shows that a plurality of pieces of data corresponding to a plurality of keys are stored. For example, "KV(Bruce)" represents a piece of data that includes a key "Bruce" and a value corresponding to the key. FIG. 3 shows that the plurality of pieces of data (key-values) are written into sequential addresses. However, this is merely an example. How to store data depends on a method of allocating KV addresses into which the data is written or the like. In the present embodiment, a piece of the data includes a key and a value (that is, a key-value). However, a piece of the data includes a value but includes no key in some embodiments. A piece of the data may include information (for example, information about the size of a value) other than a key and a value. Hereinafter, descriptions will be given assuming that a piece of the data includes at least a value. The KV storage 110 may be configured by a hard disk, an SSD, an arbitrary non-volatile memory, or any other arbitrary device that permanently has data stored therein.

The hash table storage 108 holds a hash table. The hash table is a table in which, in the entry of an address (hereinafter, "hash address") based on a hash value that is calculated by passing a key through a predetermined hash function, information relating to the key, particularly an address (a KV address) of a piece of data including a value and the like on the KV storage 110 is stored. That is, the hash table corresponds to management data in which hash addresses are associated with corresponding KV addresses. A hash address may be a hash value itself, or may be another value uniquely specified by a hash value. In the present embodiment, a hash address is assumed to be a hash value itself. The left part in FIG. 3 shows an example of the hash table. The reference characters "H1", "H5" and the like denote hash values. "ADR(Bruce)" represents a KV address on the storage that has a piece of data corresponding to the key "Bruce" stored therein. The hash table storage 108 may be configured by an arbitrary storage medium such as an SSD and a DRAM. When the hash table storage 108 is configured by a memory, the memory may be a non-volatile memory or a volatile memory.

The order key string storage 109 manages an order key string. In the order key string, a plurality of keys are held in order in accordance with a predetermined rule. For example, the order key string is a data structure such as a B-tree or an LSM-tree and holds a plurality of keys in a dictionary order. An example of the order key string is shown in the upper right part in FIG. 3. In the example in FIG. 3, keys "Bob", "Bruce", "John", and "Ken" are lined in this order. This data structure is different from a hash table in that this data structure features the easy access to previous and next keys of a specified key. The order key string may be simply a string of keys, or may include not only keys but also information relating to the keys, particularly KV addresses of corresponding values in association with the keys. Hereinafter, for simplicity, an embodiment in which the hash table is accessed to obtain a KV address will be described assuming that the included KV addresses are not associated with keys. However, in some embodiments, accessing the hash table is omitted by incorporating KV addresses that are associated with corresponding keys into the order key string, instead of accessing the hash table to obtain a KV address after accessing the order key string. Various embodiments for the configuration of the order key string can be applied but the algorithm therefor is irrelevant to the present embodiment. Thus, any algorithm can be used in the present embodiment. To manage the order key string, a file system is used as an example. Pieces of data are implemented as individual files. The order key string storage 109 may be configured by an arbitrary storage medium such as an HDD, an SSD, and a DRAM. When the order key string storage 109 is configured by a memory, the memory may be a non-volatile memory or may be a volatile memory.

In FIG. 3, arrows are shown on respective pieces of data stored in the KV storage 110. Each arrow extends from a KV address stored in an entry on the hash table or from a key (an entry) in the order key string. This shows that, in a region pointed by a KV address stored in an entry on the hash table, a piece of data to a key corresponding to the entry is stored.

The KV storage 110, the hash table storage 108, and the order key string storage 109 may be different hardware, or may be common hardware. Alternatively, one or two of the KV storage 110, the hash table storage 108, and the order key string storage 109 may be same hardware while the rest is different hardware.

The process assigner 102 requests the hash table accessor 103, the order key string accessor 104, or both of them to perform processes according to the content of a request interpreted by the request interpreter 101.

The hash table accessor 103 calculates a hash value of a specified key, accesses an entry on the hash table based on a hash address corresponding to the calculated hash value, and acquires a KV address on the KV storage 110 stored in the entry.

The KV address allocator 105 allocates KV addresses used for writing new data (for example, a value, or a key-value) into the KV storage 110. In a general KV-address allocation method, KV addresses are sequentially allocated in the order in which a PUT request arrives in a log format and writing is performed in this order. However, the allocation method is not limited thereto.

The KV accessor 106 accesses the KV storage 110 to acquire a piece of data that is stored in the KV address acquired by the hash table accessor 103 (or the order key string accessor 104).

The response generator 107 generates a response based on the piece of data (for example, a value or a key-value) acquired by the KV accessor 106 and returns the generated response to the transmission source of the request received by the request interpreter 101.

Additional descriptions will be given of the hash table. Various embodiments may be applied for the above configuration method of the hash table. For the case of a so-called collision in which different keys take an identical hash value, various algorithms are available as to how to store the entries of a plurality of the keys having the identical hash value.

For example, examples of methods against a collision include open addressing in which searching is continued until a different vacant entry is found based on a predetermined rule, and chaining in which a plurality of entries are stored in one entry using a list structure or the like. As another example, there is a method in which whether a specified key matches a corresponding entry is verified. In this method, a key itself as well as a KV address may be stored in each entry on the hash table to verify the matching between a specified key and the key stored in the entry.

To reduce the volume of the hash table, not only a KV address but also a bit string that is obtained by degenerating a key by a predetermined function may be stored in each entry on the hash table. For example, a key "Bruce" is degenerated by a function Sig( ), and the bit string Sig (Bruce) as well as ADR(Bruce) is stored in an entry. A degenerated bit string is called a degenerated key in some cases. An example of the hash table in this case is shown in FIG. 4. In this case, final verification of the complete matching with a specified key requires storing a key-value in the KV storage 110, accessing the key-value, and finally verifying matching with the key included in the key-value. That is, first, a specified key is degenerated to obtain a bit string, and it is determined whether the bit string matches a degenerated bit string that is stored in a corresponding entry on the hash table. When the bit strings do not match at this stage, it is determined that matching has failed (that is, a value stored in the KV address included in the corresponding entry is not a value corresponding the specified key) and searching entries is restarted. When the bit strings match, there is a high possibility that matching succeeds. However, complete matching has not verified yet. Accordingly, a key-value is read out by accessing the KV storage 110 based on the KV address on the KV storage 110 stored in the entry. Matching between a key included in the key-value and the specified key is verified. When the keys match, the value read out at that time is used as it is. When the keys do not match, searching the entries is restarted by returning to the hash table. The searching is repeated until a matching key is found or it is determined that no matching key is included.

The configuration of the above hash table and the search algorithm itself are irrelevant to the essence of the present embodiment. Any configuration and search algorithm may be used in the present embodiment. In the descriptions below, it is assumed that a piece of data stored on the KV storage 110 includes at least a value. However, the present embodiment is not limited thereto.

A feature of the present embodiment is to use a hash table and an order key string separately depending on the type of a request received by the request interpreter 101. Hereinafter, descriptions will be given of the operations when a GET request is received, when a GETNEXT request/a GETPREV request/a GETRANGE request is received, and when a PUT request is received.

First, the operation when a key specified GET request is received will be described. The request interpreter 101 interprets that the received request is a GET request. The process assigner 102 passes the key to the hash table accessor 103. The hash table accessor 103 accesses a table entry of the specified key using a predetermined hash function and acquires a KV address. For example, the hash table accessor 103 calculates a hash value of the specified key and identifies the entry on the hash table corresponding to the hash value. The KV accessor 106 accesses the KV storage 110 based on the KV address stored in the identified entry and reads out a piece of data (a key-value) stored in the KV storage 110. After it is determined that a key included in the read key-value matches the specified key, the response generator 107 generates a response including the read value and transmits the response to the transmission source of the GET request. Whether the key included in the read key-value matches the specified key may be determined by the KV accessor 106, the process assigner 102, or a separate processor for performing this determination. When the key included in the read key-value does not match the specified key, searching entries is restarted by returning to the hash table. The searching is repeated until a matching key is found or it is determined that no matching key is included.

Next, the operations when a GETNEXT request, a GETPREV request, or a GETRANGE request is received will be described. A GETNEXT request is a request for reading out a value corresponding to a value next to a specified key in a dictionary order. A GETPREV request is a request for reading out a value corresponding to a value previous to a specified key in a dictionary order. A GETRANGE request is a request for reading out values corresponding to all keys between two specified keys (the two keys specifying this range may be included, or may be excluded).

The process assigner 102 interprets that a GETNEXT request, a GETPREV request, or a GETRANGE request is received and notifies the specified key and the contents of the request to the order key string accessor 104.

The order key string accessor 104 identifies a key next to the specified key, a key previous to the specified key, or all keys between the two specified keys in response to the GETNEXT request, the GETPREV request, or the GETRANGE request, respectively, based on the order key string in the order key string storage 109. As described above, the order key string may hold KV addresses on the KV storage 110 that has values stored therein in such a way that the KV addresses are associated with the corresponding keys. In this case, the order key string accessor 104 may identify a KV address on the KV storage 110 of a value corresponding to the specified key.

The order key string accessor 104 passes the identified key to the process assigner 102. The process assigner 102 passes the identified key to the hash table accessor 103. The hash table accessor 103 identifies a KV address on the KV storage 110 of a value corresponding to the identified key using the hash table. When a KV address in association with the order key string is identified, the order key string accessor 104 passes the identified KV address to the KV accessor 106.

The subsequent processes are same as those to a GET request. That is, the KV accessor 106 accesses the KV storage 110 to read out a value (or a key-value, for example) and the response generator 107 generates a response including the read value (or the key-value, for example) and transmits the response to the transmission source of the request.

The operation when a PUT request is received will be described. A PUT request is a request for writing a specified value in such a way that the value is associated with a specified key.

The process assigner 102 interprets that a PUT request is received, passes a key and a value to the hash table accessor 103, and passes the key to the order key string accessor 104. The hash table accessor 103 calculates a hash value of the specified key and generates an entry corresponding to the hash address on the hash table. The KV address allocator 105 allocates to the key a KV address on the KV storage 110 in which data including the specified key and value (at least the value) is to be stored. The hash table accessor 103 stores the KV address on the KV storage 110 determined by the KV address allocator 105 in the generated entry.

The order key string accessor 104 adds the entry of the specified key to the order key string in accordance with the structure of the order key string. The order key string accessor 104 may store the KV address allocated by the KV address allocator 105 in such a way that the KV address is associated with the key. The KV address is same as that set in the generated entry on the hash table.

The KV address allocator 105 may allocate a KV address in response to at least one of a request from the hash table accessor 103 and a request from the order key string accessor 104. Alternatively, the KV address allocator 105 may allocate a KV address on the KV storage 110 in which the piece of data including the specified value is to be stored in response to a KV-address allocation request from the process assigner 102.

The KV accessor 106 writes the piece of data (here, a key-value) including the specified value into the KV address on the KV storage 110 allocated by the KV address allocator 105.

When the KV accessor 106 completes the writing, the response generator 107 generates a response showing that the PUT request has succeeded and transmits the response to the transmission source of the PUT request.

Whether a key-value corresponding to a key same as a specified key has been already stored in the KV storage 110 may need to be determined in advance. In this case, when it is determined that the hash table does not include an entry matching a concerned key, or when it is determined that the hash table does not include a matching entry at a time of reading of a key by the KV accessor 106, the KV address allocator 105 may allocate a KV address for a new piece of data (the key, the value, or the like) to be stored in the KV storage 110. When a piece of data corresponding to the specified key has been already stored, the relevant entry has been already generated in the hash table and the order key string. Accordingly, newly allocated KV addresses may be written over the respective KV addresses of the already existing entries.

In the above example, whether a piece of data (a value, a key-value, or the like) corresponding to a key same as a specified key has been already registered is determined through the hash table accessor 103. However, the determination may be performed using the order key string accessor 104. That is, it suffices that whether the order key string includes a key same as the specified key is determined. Note that the determination through the hash table accessor 103 has an advantage in that the processing speed is higher.

Figure 5:
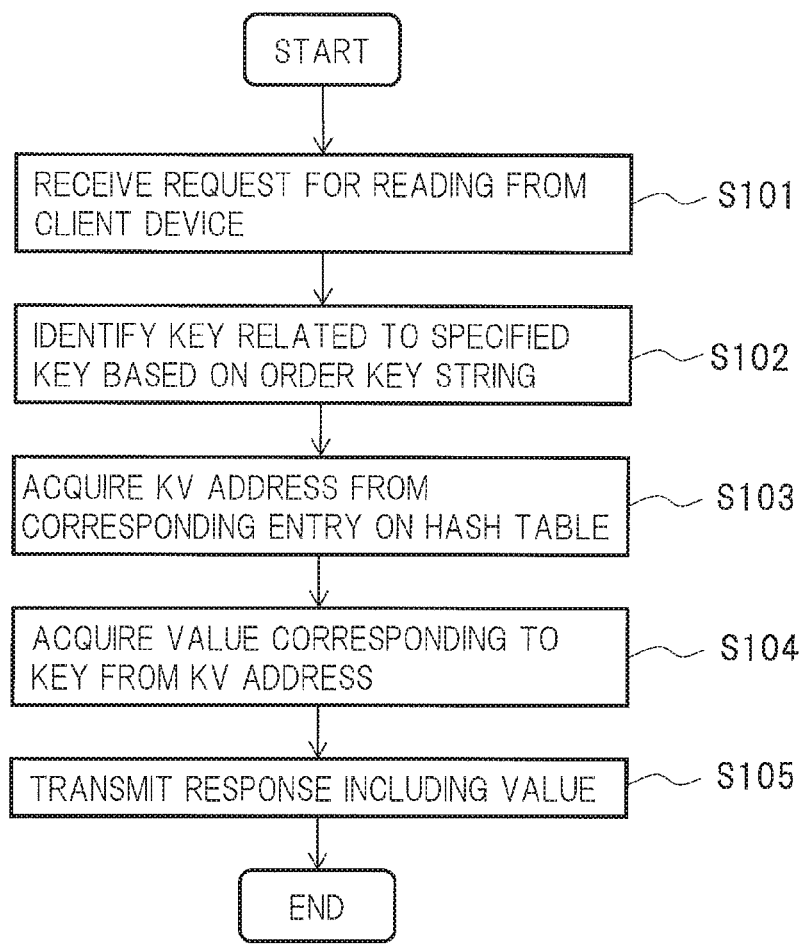
FIG. 5 is a flowchart of an operation example in the first embodiment.

FIG. 5 is a flowchart of the operation example in the present embodiment. FIG. 5 shows the operation example when a GETNEXT request is received as a request for reading.

First, the request interpreter 101 receives a GETNEXT request from a client device (see FIG. 1) through a network (S101). On the internet, the GETNEXT request is carried by TCP/IP packets.

The process assigner 102 notifies a key specified by the GETNEXT request and the process contents of the request to the order key string accessor 104. The order key string accessor 104 identifies a key (a key related to the specified key) next to the specified key based on the order key string and passes the identified key to the process assigner 102 (S102).

The process assigner 102 passes the identified key to the hash table accessor 103. The hash table accessor 103 calculates a hash value of the key. The hash table accessor 103 acquires a KV address stored in an entry corresponding to a hash address on the hash table based on the hash value (S103).

The KV accessor 106 reads out a piece of data (for example, a key-value) stored in the KV address in the KV storage 110 and takes out a value from the piece (S104).

The response generator 107 generates a response including the value acquired by the KV accessor 106 and transmits the response to the transmission source of the GETNEXT request (S105).

The operation when a GETNEXT request is received has been described above. However, the same operation is performed when a GETPREV request, a GETRANGE request, or the like is received.

Figure 6:
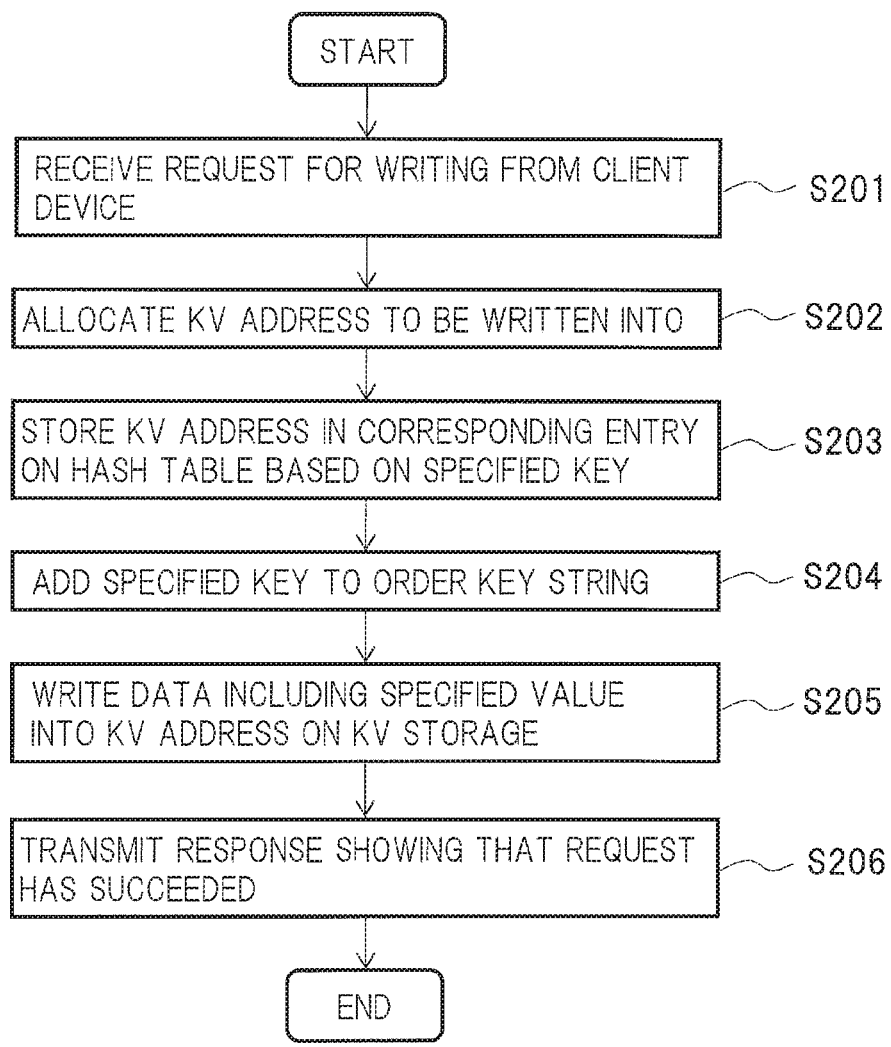
FIG. 6 is a flowchart of another operation example in the first embodiment.

FIG. 6 is a flowchart of another operation example in the present embodiment. FIG. 6 shows the operation example when a PUT request is received as a request for writing.

First, the request interpreter 101 receives a PUT request from a client device through a network (S201).

The process assigner 102 passes a key and a value specified by the PUT request to the hash table accessor 103. The hash table accessor 103 calculates a hash value of the key. Also, the hash table accessor 103 requests the KV address allocator 105 to allocate a KV address and receives an allocated KV address (S202) and stores the KV address in an entry corresponding to a hash address based on the hash value on the hash table (S203).

The process assigner 102 passes the key specified by the PUT request to the order key string accessor 104. The order key string accessor 104 adds the specified key to the order key string (S204).

The KV accessor 106 writes a piece of data (for example, a key-value) including the specified value in the KV address on the KV storage 110 allocated by the KV address allocator 105 (S205).

When the KV accessor 106 completes the writing, the response generator 107 generates a response showing that the PUT request has succeeded and transmits the response to the transmission source of the PUT request (S206).

According to the present embodiment in response to a GET request, high-speed searching as fast as in a hash table system is performed and a response is returned. Furthermore, in response to a request needed in consideration with the order of the key such as a GETNEXT request/a GETPREV request/a GETRANGE request, high-speed searching is also performed and a response is returned.

Second Embodiment

Figure 7:
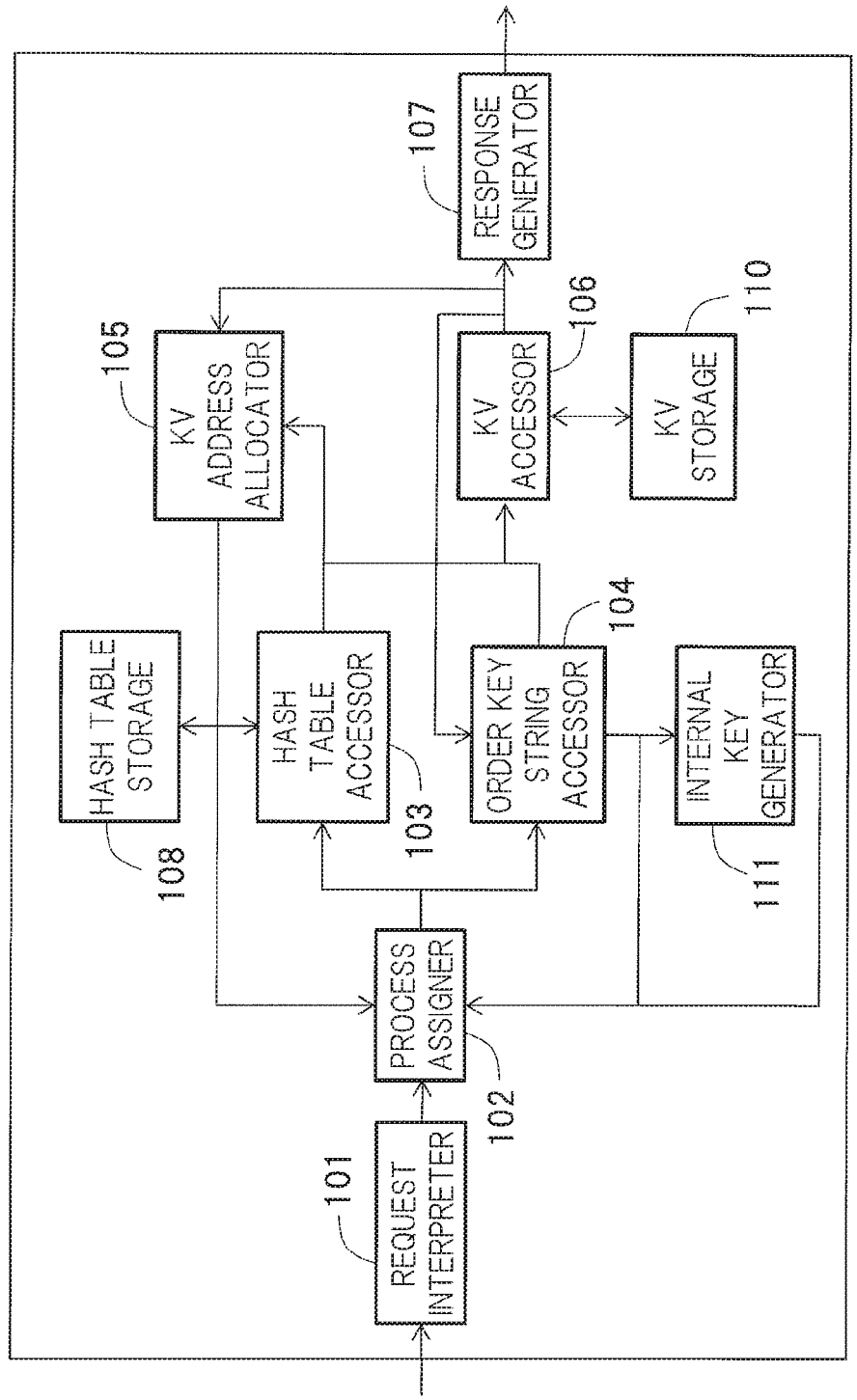
FIG. 7 is a block diagram of a data processing device according to a second embodiment.

FIG. 7 shows a data processing device according to a second embodiment of the present invention. The data processing device in FIG. 7 is configured by expanding the data processing device in the first embodiment. Unlike in the first embodiment, an internal key generator 111 is added and the order key string storage 109 is eliminated. The second embodiment differs from the first embodiment in that an order key sting is managed as a value by the KV storage 110. Hereinafter, the differences from the first embodiment will be mainly described. Descriptions of configurations and operations identical to those in the first embodiment will be omitted as appropriate.

In the first embodiment, the order key string is managed by the order key string storage 109 (see FIG. 2) and the example in which the order key string is managed by a file system has been described. Since an order key string, in which all keys lined in a dictionary order are stored, has a large volume by itself, the order key sting is generally divided into a plurality of sections. Each section is a subset of an entire set and manages keys that are lined in a dictionary order by itself. As a matter of course, it is necessary to insert a new key into the existing key string or delete a key in the key string. Therefore, the position or length of a key needs to be flexibly changeable and each section itself needs to be newly generated or deleted easily. To achieve this, the aforementioned file system is used in which each section is implemented as an individual file. Consequently, the implementation becomes easy. However, when the file system is used, a widely usable and complicated mechanism is required thereby making the entire configuration complicated. Thus, in terms of performance, the efficiency may be lowered.

Therefore, in the present embodiment, an order key string is managed as an internal key-value by the KV storage 110 without using a file system.

When the order key string accessor 104 receives a PUT request, the order key string accessor 104 generates a new order key string having a key specified by the PUT request added thereto (the details will be described later). The internal key generator 111 generates an internal key by a predetermined method. In an example, the internal key generator 111 always generates an internal key having a constant value. In the following description, it is assumed that the internal key generator 111 always generates an internal key having a constant value. The process assigner 102 passes the internal key and the new order key string to the hash table accessor 103. The hash table accessor 103 calculates a hash value from the internal key, generates an entry corresponding to a hash address based on the hash value, and stores, in the generated entry, a KV address on the KV storage 110 in which the new order key string is to be stored. The KV address may be allocated by requesting the KV address allocator 105, for example. The KV accessor 106 stores the new order key string as a normal value (data) in the KV address on the KV storage 110.

As a specific example, it is assumed that the data processing device is started and a first PUT (Key="John", Value="GHI") is received. At that time, since this device first stores a specified key and value therein, only the specified key ("John") is included in the order key string. Thus, to store a piece of data (a value) corresponding to an internal key in the KV storage 110 by using the key as a first order key string, the internal key generator 111 generates Key="key_seq0" and sets Value="John", for example. The internal key generator 111 passes the key and the value to the process assigner 102. The process assigner 102 passes the internal key and the value "John" to the hash table accessor 103. The hash table accessor 103 calculates a hash value of the internal key "key_seq0" and stores a KV address in which "John" is to be stored in an entry of the hash value on the hash table. The KV address is allocated by the KV address allocator 105. The KV accessor 106 stores "John" as a normal value in the KV storage 110. Processing in response to the PUT request is also performed as in the first embodiment. That is, a KV address on the KV storage 110 in which "GHI" is to be stored in an entry corresponding to a hash value of "John" and a piece of data including "GHI" is stored in the KV address on the KV storage 110. Which of the above processes is performed first is arbitrarily decided.

When a PUT (Key="Bob", Value="JKL") request is further received, the order key string accessor 104 first reads out the current order key string. That is, the order key string accessor 104 requests the internal key generator 111 to generate an internal key. The internal key generator 111 generates Key="key_seq0" and passes the Key="key_seq0" to the process assigner 102. The process assigner 102 transmits the Key="key_seq0" to the hash table accessor 103. The hash table accessor 103 calculates a hash value of "key_seq0" and acquires a KV address stored in an entry corresponding to the hash value. The KV accessor 106 reads out a piece of data, that is, "John" that is the value of the internal key "key_seq0" from the KV address on the KV storage 110. The KV accessor 106 passes "John" to the order key string accessor 104. Accordingly, the order key string accessor 104 acquires the current order key string "John". The Key="Bob" specified by the current PUT request and the current order key string "John" are compared with each other and "Bob" is arranged before "John". As a result, a new order key string "Bob John" is generated. The new order key string "Bob John" is set to a new value and the fixed value "key_seq0" is set to the internal key. Similarly to the previous time, a KV address on the KV storage 110 in which "Bob John" is to be stored is overwritten in the entry corresponding to the hash value of the internal key in the hash table and "Bob John" is stored in the KV address on the KV storage 110. The KV address is allocated by the KV address allocator 105. Processing in response to the PUT request itself is also performed. That is, a KV address on the KV storage 110 in which "JKL" is to be stored is stored in an entry corresponding to a hash value of "Bob" and a piece of data including "JKL" is stored in the KV address on the KV storage 110. Which of the above processes is performed first is arbitrarily decided.

When a PUT (Key="Ken", Value="MNO") request is subsequently received, a value (a piece of data) "Bob John Ken" is read out as a current order key string from the KV storage 110 by using an internal key "key_seq0" in the similar manner. "Ken" is added to the current order key string to obtain a new order key string "Bob John Ken". The hash table and the KV storage 110 are updated as in the previous time. Processing in response to the PUT request is also performed as in the previous time.

When a PUT (Key="Bruce", Value="PQR") request is further received, a value (a piece of data) "Bob John Ken" is read out as a current order key string from the KV storage 110 by generating an internal key "key_seq0" in the similar manner, "Bruce" is added to the current order key string to obtain a new order key string "Bob Bruce John Ken". The hash table and the KV storage 110 are updated as in the previous time. Processing in response to the PUT request itself is also performed as in the previous time.

Figure 8:
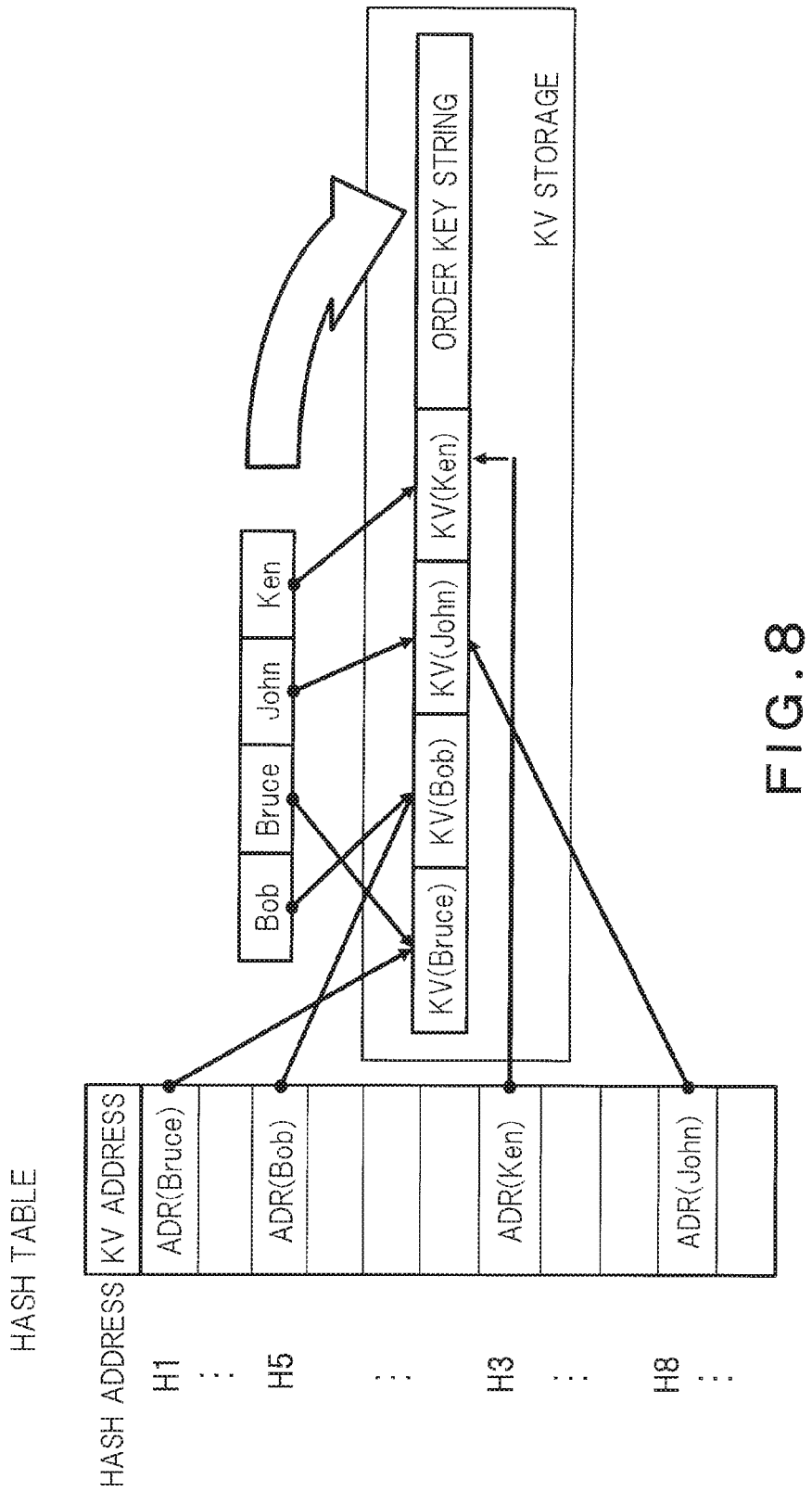
FIG. 8 is a diagram showing a way of storing an order key arrangement as a value.

FIG. 8 shows a data structure in the KV storage 110 in the present embodiment. A piece of data (a value) including an order key string is stored in the KV storage 110 at a similar position to those of values corresponding to normal keys.

When a GETNEXT (Key="John") request is received, the order key string accessor 104 first reads out a current order key string as in the above case. That is, the order key string accessor 104 requests the internal key generator 111 to generate an internal key, the internal key generator 111 generates a fixed value "key_seq0" as an internal key and passes "key_seq0" to the process assigner 102. The process assigner 102 passes "key_seq0" to the hash table accessor 103 and acquires a KV address having a value (a piece of data) corresponding to the internal key stored therein from the hash table. The KV accessor 106 reads out "Bob Bruce John Ken" that is a value to the internal key "key_seq0" from the acquired KV address on the KV storage 110. The KV accessor 106 passes "Bob Bruce John Ken" to the order key string accessor 104. In this way, the order key string accessor 104 acquires the current order key string. From the information in this order key string, it is verified that a key next to "John" specified by the GETNEXT is "Ken". The order key string accessor 104 passes the key "Ken" to the process assigner 102. The process assigner 102 passes the key "Ken" to the hash table accessor 103. The hash table accessor 103 acquires a KV address from an entry corresponding to a hash value of "Ken". The KV accessor 106 reads out a piece of data from the KV address in the KV storage 110 and takes out a value corresponding to the key "Ken" from the read piece of data. The response generator 107 generates a response including the taken value and transmits the response to the transmission source of the GETNEXT request.

Every time a PUT request is received, the size of the order key string increases. Thus, the order key string may be divided as appropriate in such a way that a different internal key is allocated to each divided string. For example, the order key string corresponding to the internal key "key_seq0" is divided into two and internal keys "key_seq1" and "key_seq2" are allocated to the two divided strings, respectively. Algorithm for dividing and managing the order key string may follow the various conventional methods such as an LSM-tree. In the present embodiment, the contents of the algorithm are not limited. In this case, it suffices that the internal key generator 111 having received a request for reading such as a GET request identifies an internal key based on the algorithm. For simplicity, the order key string may be divided into alphabetic ranges. For example, the order key string is divided into two groups, "A to L" and "M to Z" and internal keys "key_seq1" and "key_seq2" are allocated to the two groups, respectively. When the first alphabet of a key specified by a read request belongs to "A to L", the internal key may be determined as "key_seq1", while the first alphabet belongs to "M to Z", the internal key may be determined as "key_seq2". The above example is merely an example having the possibility of realizing. Any other methods can be applied.

An internal key generated by the internal key generator 111 may have a same value as a key (referred to as "external key") specified by a request received by the request interpreter or the like. To solve this problem, information for distinguishing between external keys and internal keys may be added to an external key and an internal key. For example, an external key invariably begins with "0" and an internal key invariably begins with "1". That is, "0John" is set for an external key "John" by adding "0" at the head of "John", and "1key_seq0" is set for an internal key "key_seq0" by adding "1" at the head of "John". In this way, internal keys and external keys having respective particular identifiers can be identified from each other. Any formats can be used for such identifiers and any method can be used for adding such identifiers.

Figure 9:
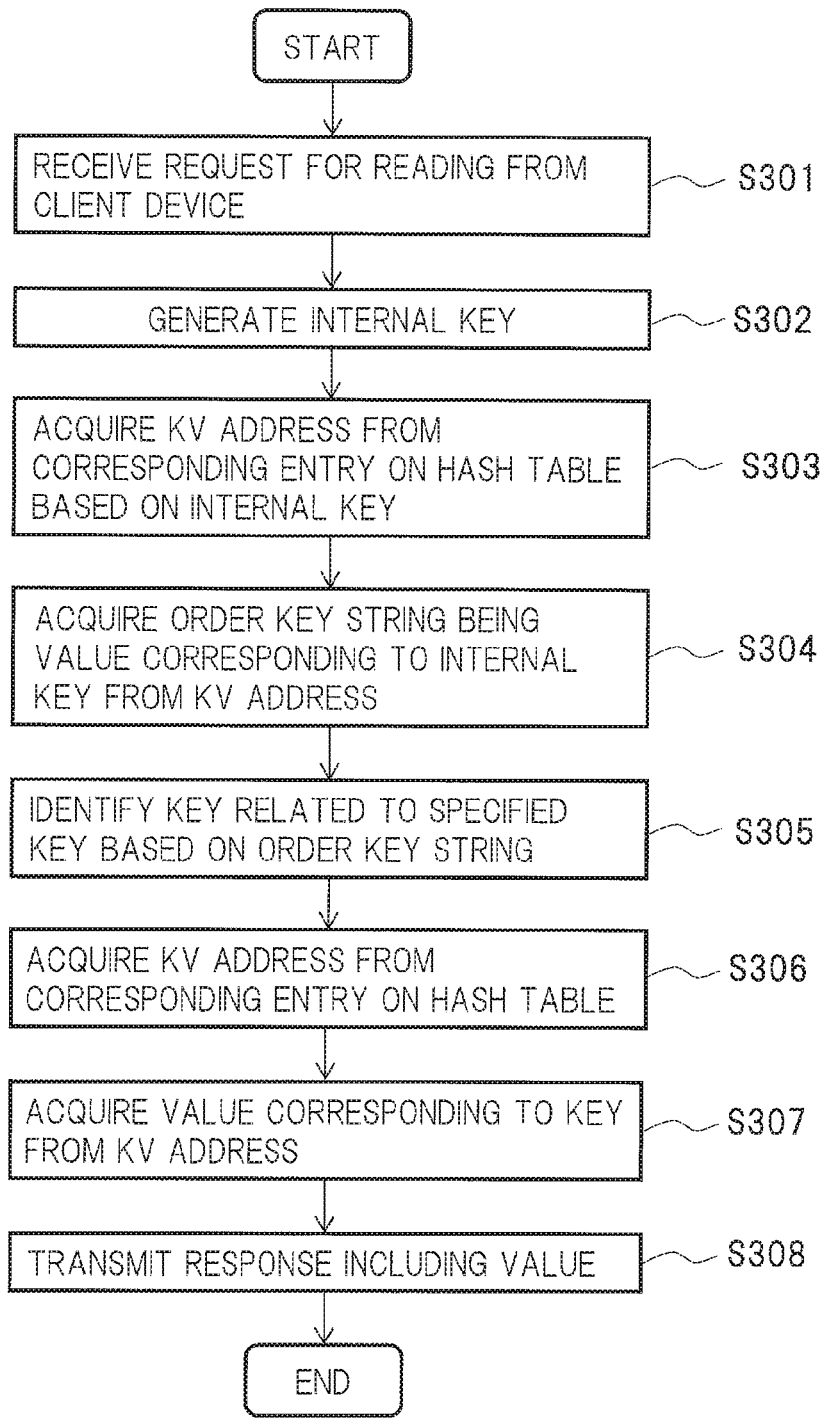
FIG. 9 is a flowchart of an operation example in the second embodiment.

FIG. 9 is a flowchart of the operation example in the present embodiment. FIG. 9 shows the operation example when a GETNEXT request is received as a request for reading.

First, the request interpreter 101 receives a GETNEXT request from a client device through a network (S301).

The process assigner 102 passes a key specified by the GETNEXT request to the order key string accessor 104. The order key string accessor 104 requests the internal key generator 111 to generate an internal key. The internal key generator 111 generates an internal key and transmits the internal key to the process assigner 102 (S302).

The process assigner 102 passes the internal key to the hash table accessor 103. The hash table accessor 103 calculates a hash value of the internal key. The hash table accessor 103 acquires a KV address stored in an entry corresponding to a hash address on the hash table based on the hash value (S303).

The KV accessor 106 reads a piece of data stored in the KV address on the KV storage 110 and takes out an order key string as a value from the read piece of data (S304).

The order key string accessor 104 identifies a key next to the specified key in the order key string and transmits the identified key to the process assigner 102 (S305).

The process assigner 102 passes the key to the hash table accessor 103. The hash table accessor 103 calculates a hash value of the key. The hash table accessor 103 acquires a KV address stored in an entry corresponding to a hash address on the hash table based on the hash value (S306).

The KV accessor 106 reads out a piece of data stored in the KV address on the KV storage 110 and takes out a value from the read piece of data (S307).

The response generator 107 generates a response including the value acquired by the KV accessor 106 and transmits the response to the transmission source of the GETNEXT request (S308).

The operation when the GETNEXT request is received has been described above. However, the same operation is performed when a GETPREV request, a GETRANGE request, or the like is received.

Figure 10:
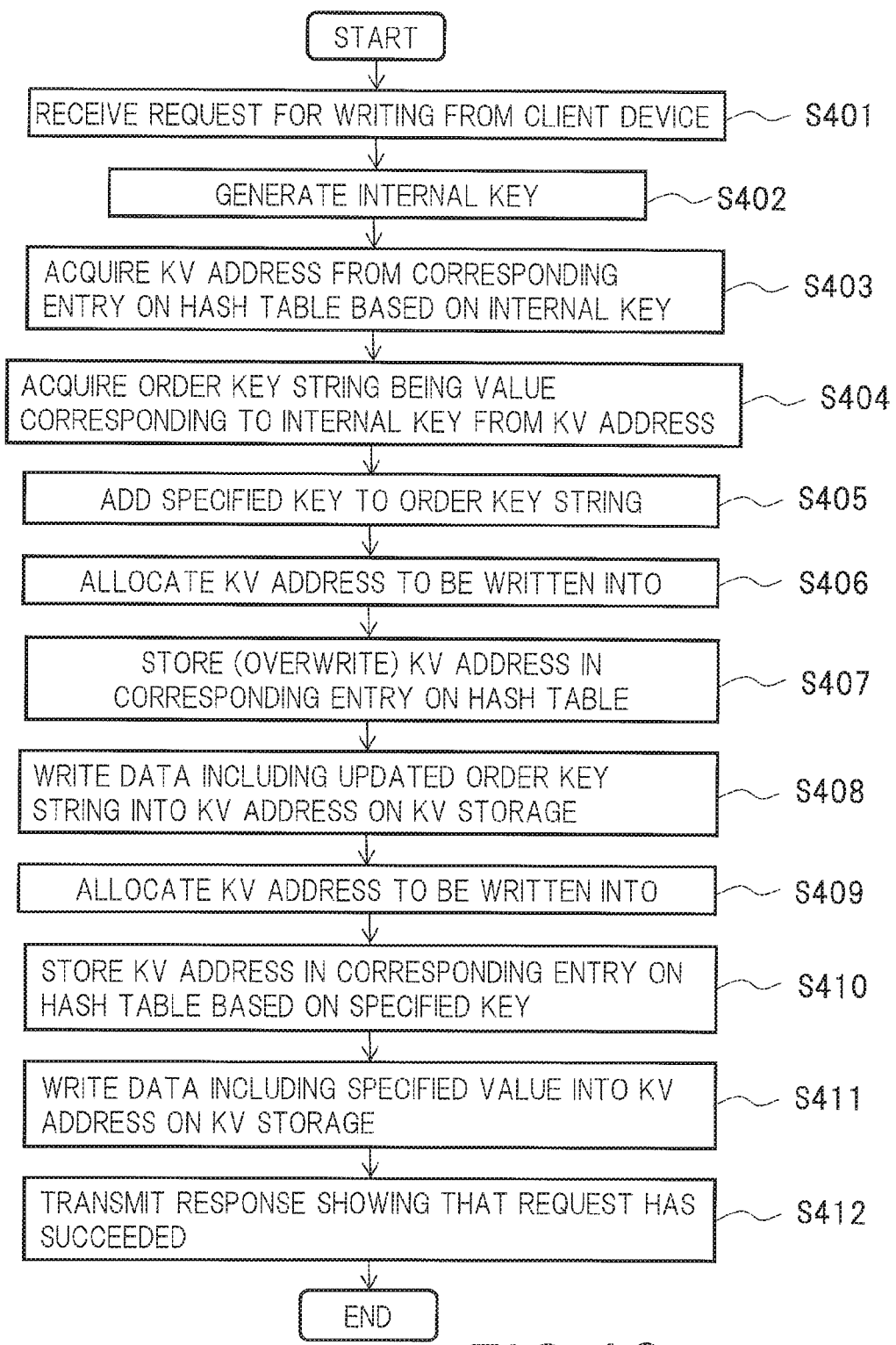
FIG. 10 is a flowchart of another operation example in the second embodiment.

FIG. 10 is a flowchart of another operation example in the present embodiment. FIG. 10 shows an operation example when a PUT request is received as a request for writing.

First, the request interpreter 101 receives a PUT request from a client device through a network (S401).

The process assigner 102 passes a key specified by the PUT request to the order key string accessor 104. The order key string accessor 104 requests the internal key generator 111 to generate an internal key. The internal key generator 111 generates an internal key and transmits the internal key to the process assigner 102 (S402).

The process assigner 102 passes the internal key to the hash table accessor 103. The hash table accessor 103 calculates a hash value of the internal key. The hash table accessor 103 acquires a KV address from an entry corresponding to the hash value (S403) and passes the KV address to the KV accessor 106. The KV accessor 106 reads out a piece of data from the KV address on the KV storage 110 and acquires an order key string from the piece of data (S404).

The order key string accessor 104 adds the key specified by the PUT request to the acquired order key string to update the order key string and passes the updated order key string to the hash table accessor 103 (S405). The hash table accessor 103 requests the KV address allocator 105 to allocate a KV address and receives an allocated KV address (S406). The hash table accessor 103 stores (overwrites) the KV address in an entry corresponding to a hash address on the hash table based on a hash value of the updated order key string (S407). The KV accessor 106 writes a piece of data including the updated order key string into the KV address on the KV storage 110 (S408).

The process assigner 102 passes the key and value specified by the PUT request to the hash table accessor 103. The hash table accessor 103 calculates a hash value of the specified key. The hash table accessor 103 requests the KV address allocator 105 to allocate a KV address and receives an allocated KV address (S409) and stores the KV address in an entry corresponding to a hash address on the hash table based on the hash value (S410).

The KV accessor 106 writes a piece of data including the specified value into the KV address on the KV storage 110 (S411).

When the KV accessor 106 completes the writing, the response generator 107 generates a response showing that the PUT request has succeeded and transmits the response to the transmission source of the PUT request (S412).

As described above, according to the present embodiment, since the order key string can be managed as a value on the hash-table based KVS, a file system for managing an order key string is not required. Therefore, the data structure can be simplified as a whole.

The data processing device as described above may also be realized using a general-purpose computer device as basic hardware. That is, each function block (or each section) in the data processing device can be realized by causing a processor mounted in the above general-purpose computer device to execute a program. In this case, the data processing device may be realized by installing the above described program in the computer device beforehand or may be realized by storing the program in a storage medium such as a CD-ROM or distributing the above described program over a network and installing this program in the computer device as appropriate. Furthermore, the storage in the data processing device may also be realized using a memory device or hard disk incorporated in or externally added to the above described computer device or a storage medium such as CD-R, CD-RW, DVD-RAM, DVD-R as appropriate.

The terms used in the embodiments should be interpreted in a broad sense. For example, the term "processor" may include a general-purpose processor, a central processing unit (CPU), a microprocessor, a digital signal processor (DSP), a controller, a microcontroller, and a state machine. In some cases, the term "processor" may refer to an application specific integrated circuit, a field programmable gate array (FPGA), a programmable logic device (PLD). The term "processor" may further refer to a combination of a plurality of processing devices such as microprocessors, a combination of a DSP and a microprocessor, or one or more microprocessors cooperating with a DSP core.

The term "memory" may include an arbitrary electronic component that can have electronic information stored therein. The term "memory" may refer to a random access memory (RAM), a read only memory (ROM), a programmable read-only memory (PROM), an erasable programmable read-only memory (EPROM), an electrically erasable programmable read-only memory (EPROM), a non-volatile random access memory (NVRAM), a flash memory, a magnetic or optical data storage, which can be read by a processor. When the processor reads and/or writes information from/into the memory, the memory electrically communicates with the processor. The memory may be integrated with the processor. In this case, the memory electrically communicates with the processor as well.

The term "storage" encompasses devices that can have data permanently stored therein using a magnetic, optical, or non-volatile memory such as an HDD, an optical disk, an SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data processing device comprising:
a receiving circuit configured to receive a first put request specifying a first key and a first value;
a storage configured to store pieces of data and a hash table, wherein each of the pieces of data is associated with a hash address; and
a processing circuit configured to:
calculate a first hash value from an internal key having a constant value based on the first put request;
generate a first entry of the hash table including a first hash address based on the first hash value;
store an order key string in a first key value address corresponding to the first hash address, wherein the order key string includes the first key specified in the first put request;
calculate a second hash value from the first key specified in the first put request;
generate a second entry of the hash table including a second hash address based on the second hash value; and
store the first value specified in the first put request in a second key value address corresponding to a second hash address of the storage.

2. The data processing device according to claim 1, wherein the receiving circuit is configured to receive a second put request specifying a second key and a second value, and
the processing circuit is configured to:
calculate the first hash value from the internal key;
acquire the first hash address corresponding to the first hash value from the first entry in the hash table;
read the order key string stored in the first key value address corresponding to the first hash address corresponding to the first hash value;
generate a new order key string including the second key specified in the second put request;
store the new order key string to the first key value address corresponding to the first hash address;
calculate a third hash value from the second key specified in the second put request;
generate a third entry of the hash table including a third hash address based on the third hash value; and
store the second value specified in the second put request to a third key value address corresponding to the third hash address of the storage.

3. The data processing device according to claim 2, wherein the receiving circuit is configured to receive a getnext request specifying a third key, and
the processing circuit is configured to:
calculate the first hash value from the internal key;
acquire the first hash address corresponding to the first hash value from the first entry in the hash table;
read the order key string stored in the first key value address corresponding to first hash address corresponding to the first hash value;
specify a next key in the order key string, wherein the next key is next to the third key specified in the getnext request within the order key string;
calculate a fourth hash value from the next key;
acquire a fourth hash address corresponding to the fourth hash value from a fourth entry in the hash table; and
read a third value stored in a fourth key value address corresponding to the fourth hash address of the storage.

4. The data processing device according to claim 2, wherein receiving circuit is configured to receive a getprev request specifying a fourth key, and
the processing circuit is configured to:
calculate the first hash value from the internal key;
acquire the first hash address corresponding to the first hash value from the first entry in the hash table;
read the order key string stored in the first key value address corresponding to the first hash address corresponding to the first hash value;
specify a previous key in the order key string, wherein the previous key is previous to the fourth key specified in the getprev request within the order key string;

calculate a fifth hash value from the previous key;
acquire a fifth hash address corresponding to the fifth hash value from a fifth entry in the hash table; and
read a fourth value stored in a fifth key value address corresponding to the fifth hash address of the storage.

5. The data processing device according to claim 2, wherein the processing circuit is configured to divide the order key string and assign different internal keys to each of the divided order key strings.

6. The data processing device according to claim 1, wherein a plurality of keys in the order key string are in dictionary order.

7. A data processing method comprising the steps of:
receiving a first put request specifying a first key and a first value;
calculating a first hash value from an internal key having a constant value based on the first put request;
generating a first entry of a hash table including a first hash address based on the first hash value;
storing an order key string in a first key value address corresponding to the first hash address, wherein the order key string includes the first key specified in the first put request;
calculating a second hash value from the first key specified in the first put request;
generating a second entry of the hash table corresponding to a second hash address based on the second hash value; and
storing the first value specified in the first put request in a second key value address corresponding to a second hash address of a storage.

8. The data processing method according to claim 7, further comprising the steps of:
receiving a second put request specifying a second key and a second value;
calculating the first hash value from the internal key;
acquiring the first hash address corresponding to the first hash value from the first entry in the hash table;
reading the order key string stored in the first key value address corresponding to the first hash address corresponding to the first hash value;
generating a new order key string by including the second key specified in the second put request;
storing the new order key string to the first key value address corresponding to the first hash address;
calculating a third hash value from the second key specified in the second put request;
generating a third entry of the hash table including a third hash address based on the third hash value; and
storing the second value specified in the second put request to a third key value address corresponding to the third hash address of the storage.

9. The data processing method according to claim 8, further comprising the steps of:
receiving a getnext request specifying a third key;
calculating the first hash value from the internal key;
acquiring the first hash address corresponding to the first hash value from the first entry in the hash table;
reading the order key string stored in the first key value address corresponding to the first hash address corresponding to the first hash value;
specifying a next key in the order key string, wherein the next key is next to the third key specified in the getnext request within the order key string;
calculating a fourth hash value from the next key;
acquiring a fourth hash address corresponding to the fourth hash value from a fourth entry in the hash table; and
reading a third value stored in a fourth key value address corresponding to the fourth hash address of the storage.

10. The data processing method according to claim 8, further comprising the steps of:
receiving a getprev request specifying a fourth key;
calculating the first hash value from the internal key;
acquiring the first hash address corresponding to the first hash value from the first entry in the hash table;
reading the order key string stored in the first key value address corresponding to the first hash address corresponding to the first hash value;
specifying a previous key in the order key string, wherein the previous key is previous to the fourth key specified in the getprev request within the order key string;
calculating a fifth hash value from the previous key;
acquiring a fifth hash address corresponding to the fifth hash value from a fifth entry in the hash table; and
reading a fourth value stored in a fifth key value address corresponding to the fifth hash address of the storage.

11. A non-transitory computer readable medium having a program stored therein which, when executed by a computer, causes the computer to perform processing comprising:
receiving a first put request specifying a first key and a first value;
calculating a first hash value from an internal key having a constant value;
generating a first entry of a hash table including a first hash address based on the first hash value;
storing an order key string in the first key value address corresponding to the first hash address, wherein the order key string includes the first key specified in the first put request;
calculating a second hash value from the first key specified in the first put request;
generating a second entry of the hash table corresponding to a second hash address based on the second hash value; and
storing the first value specified in the first put request in a second key value address corresponding to a second hash address of a storage.

12. The medium according to claim 11, the program causing, when executed by a computer, to perform processing comprising:
receiving a second put request specifying a second key and a second value;
calculating the first hash value from the internal key;
acquiring the first hash address corresponding to the first hash value from the first entry in the hash table;
reading the order key string stored in the first key value address corresponding to the first hash address corresponding to the first hash value;
generating a new order key string by including the second key specified in the second put request;
storing the new order key string to the first key value address corresponding to the first hash address;
calculating a third hash value from the second key specified in the second put request;
generating a third entry of the hash table including a third hash address based on the third hash value; and
storing the second value specified in the second put request to a third key value address corresponding to the third hash address of the storage.

13. The medium according to claim 12, the program causing, when executed by a computer, to perform processing comprising:
receiving a getnext request specifying a third key;
calculating the first hash value from the internal key;
acquiring the first hash address corresponding to the first hash value from the first entry in the hash table;
reading the order key string stored in the key value address corresponding to the first hash address corresponding to the first hash value;
specifying a next key in the order key string, wherein the next key is next to the third key specified in the getnext request within the order key string;
calculating a fourth hash value from the next key;
acquiring a fourth hash address corresponding to the fourth hash value from a fourth entry in the hash table; and
reading a third value stored in a fourth key value address corresponding to the fourth hash address of the storage.

14. The medium according to claim 12, the program causing, when executed by a computer, to perform processing comprising:
receiving a getprev request specifying a fourth key;
calculating the first hash value from the internal key;
acquiring the first hash address corresponding to the first hash value from the first entry in the hash table;
reading the order key string stored in the first key value address corresponding to the first hash address corresponding to the first hash value;
specifying a previous key in the order key string, wherein the previous key is previous to the fourth key specified in the getprev request within the order key string;
calculating a fifth hash value from the previous key;
acquiring a fifth hash address corresponding to the fifth hash value from a fifth entry in the hash table; and
reading a fourth value stored in a fifth key value address corresponding to the fifth hash address of the storage.

* * * * *